United States Patent [19]
Steinberg et al.

[11] 3,801,358
[45] Apr. 2, 1974

[54] REFUSE AND SEWAGE POLYMER IMPREGNATED CONCRETE

[75] Inventors: Meyer Steinberg, Huntington Station; Gerald Farber, Elmont, both of N.Y.

[73] Assignee: The United States of America as represented by the United States Atomic Energy Commission, Washington, D.C.

[22] Filed: Mar. 22, 1972

[21] Appl. No.: 236,965

[52] U.S. Cl. ............ 117/113, 52/DIG. 9, 117/93.31, 141/71, 161/7, 204/159.22
[51] Int. Cl. .......................... B65b 1/20, B05c 3/02
[58] Field of Search ..................... 161/7; 52/DIG. 9; 117/93.31, 113, 123; 264/330, 333; 141/71

[56] References Cited
UNITED STATES PATENTS

| | | | |
|---|---|---|---|
| 3,567,496 | 3/1971 | Steinberg et al. | 117/113 |
| 3,383,228 | 5/1968 | Rekate et al. | 264/330 |
| 3,713,860 | 1/1973 | Auskern | 117/93.31 |
| 3,330,088 | 7/1967 | Dunlea, Jr. | 161/7 |

OTHER PUBLICATIONS

Brookhaven National Laboratory, Annual Report Dec. 31, 1969, pages 58, 59.

*Primary Examiner*—George F. Lesmes
*Assistant Examiner*—Paul J. Thibodeau
*Attorney, Agent, or Firm*—John A. Horan; Leonard Belkin

[57] ABSTRACT

A load bearing composite and a method of producing such a product comprising sewage and refuse bound in a cement and penetrated with a polymer for strength and water impermeability.

4 Claims, No Drawings

REFUSE AND SEWAGE POLYMER IMPREGNATED CONCRETE

SOURCE OF THE INVENTION

The invention described herein was made in the course of, or under a contract with the U.S. Atomic Energy Commission.

BACKGROUND OF THE INVENTION

U.S. Pat. No. 3,567,496 entitled "Method of Producing Plastic Impregnated Concrete" describes a method of producing concrete bodies for structural use in which the cured concrete block is impregnated with a liquid monomer and a catalyst, and then heated to cause polymerization. A building block thus prepared has improved compressive and tensile strength and decreased water permeability.

The relatively heavy weight of concrete blocks, with or without polymerization has long been a limit on its potential usefulness, due to cost and structural considerations. However, no substitute of lighter weight has been found to have comparable qualities of strength and usefulness.

SUMMARY OF THE INVENTION

It has been found, in accordance with the principles of this invention, that certain waste materials, such as refuse and sewage produced by a typical municipality, if properly treated can be converted into a useful building block or similar unit having physical properties similar to that of the conventional concrete block and yet at a substantially reduced weight.

In a preferred embodiment of this invention, raw sewage from a typical municipal sewage system or sludge from a treatment plant is taken and if desired sufficient water is removed to reduce the sewage to 20 to 30 percent solids by weight, and refuse is taken from a typical municipal collection system and compacted until the specific gravity is approximately unity. Then a mixture is formed with about 50 percent by weight refuse and the remainder sewage and hydraulic cement, the latter being present in an amount sufficient to produce proper curing after shaping. After curing, the shaped body is dried if necessary and then impregnated with a monomer in an amount sufficient to make the resulting composite impervious to water and structurally sound after polymerization. Polymerization can be induced either with the use of a catalyst and heating as in the aforementioned patent application or by irradiation. Since the materials are bacterially active, radiation has the added advantage of more effectively sterilizing the product.

In another embodiment of this invention, there is produced a material of construction comprising a composite of an aggregate consisting of a mixture of compacted refuse and reduced sewage, cured hydraulic cement, and sufficient organic polymer distributed in association with the said composite so as to make the latter impervious to water and structurally sound, the refuse being present in the amount of about 50 percent by weight.

It is thus a principal object of this invention to provide an improved load bearing composite.

Other objects and advantages of this invention will hereinafter become obvious from the following description of preferred embodiments of this invention.

DESCRIPTION OF THE PREFERRED EMBODIMENTS

By the term sewage is meant either a mixture in fluid primarily water of paper, feces, food, and similar materials in any proportion normally collected by a public or municipal sewage plant or a sludge effluent from a sewage treatment plant.

By the term refuse is meant a physical mixture of paper, broken glass, bits of metal, wood and garbage, in any proportion as is normally collected by a municipal or public trash collection agency.

A reduced sewage may be prepared by filtering out or evaporating sufficient water to provide sludge of 20 to 30 percent solids by weight. The refuse is prepared for use in this invention by compacting in any conventional compacting device until the resulting product has a specific gravity of at least about unity, equal to that of water alone.

The sewage, compacted refuse and hydraulic cement are then mixed in the proportions of about 50 percent of refuse by weight with the remainder consisting of the sewage, cement, and water if needed. The cement and water are present in sufficient amount to provide proper curing. By about 50 percent of refuse is meant anywhere in the range of about 35 to 65 percent. The mixture is shaped to the final form and permitted to cure or set, after which, the set object is impregnated with monomer by any suitable known technique in the amount of 10 to 30 percent by weight of the final product.

Any commercially available monomer may be employed. In the preferred embodiment of our invention we use methyl methacrylate as the monomer.

Polymerization can be accomplished by either thermal means or by irradiation. In thermal polymerization, the monomer contains about 1 percent by weight catalyst.

Conventional free radical peroxide polymerization catalysts can be used in the practice of the invention such as benzoyl peroxide, azoisobutyronitrile, methyl ethyl ketone peroxide, cyclohexononeperoxide, and tertiary butyl peroxide. In the preferred embodiment of our invention we employ about 1 weight percent of azoisobutyronitrile based on the weight of monomer employed.

The concrete should be substantially dry before it is impregnated with the monomer and catalyst and in most cases it is recommended that the concrete body be heated and placed under a vacuum of 3 inches of mercury or less for 1 hour to ensure dryness. The impregnation should be carried out at temperatures below 30° C. to prevent premature polymerization of the monomer. Impregnation can be accomplished by immersing the concrete body in the monomer and catalyst. Pressure can be used to increase the rate of impregnation.

Dyes can be added to the monomer and catalyst which are compatible with the system to produce concrete having desired color properties.

A solvent can be employed to enhance the degree of impregnation of the monomer and catalyst. Also, preevacuation pressurization soaking, and gas phase saturation can be advantageously employed to improve impregnation.

The length of heating time and temperature employed will of course be related to the type and amount of monomer and catalyst employed as well as the degree of polymerization desired.

For irradiation polymerization, methyl methacrylate may be employed as the monomer, and cobalt-60 can be employed as the source of gamma rays to promote polymerization. An advantage of radiation is that is provides for an improved sterilization quality of the finished block.

A standard building block manufactured in accordance with this invention has a density of about 93 lb./ft$^3$ as compared to 150 lb./ft$^3$ for standard concrete block, for a reduction in weight of about 38 percent. This is due in part to the specific gravity of 1 for the compacted refuse compared to near 2.5 for the aggregate used in the conventional concrete block.

It has been found that a building block (8 inches × 8 inches × 18 inches), weighing 25 lbs., made in accordance with this invention has a compressive strength of 3,000 psi which is about equal to that of the conventional block weighing 40 lbs. so that it is readily apparent that a building block made in accordance with this invention provides a substantial saving in weight without sacrificing strength. With regard to costs involved, it should be noted that offsetting the costs of polymerization are the little or no cost of the aggregate consisting of the sewage and refuse and the reduced cement requirements. For example, a conventional concrete block requires almost twice the cement by weight as compared to that in the block made according to this invention. Another definite advantage of using refuse and sewage in building blocks is to cement together waste material into a useable and saleable product, thus decreasing the waste disposal problem and extending our natural resources.

In addition to a standard building block, other building products such as foundation blocks, seawalls and landfills could be made as well.

The following examples illustrate this invention:

EXAMPLE 1

A mixture consisting of 50 percent refuse, 20 percent sewage, and 30 percent cement is prepared by first mixing 100 gm of sewage sludge with 150 gm of cement, and then with 250 gm of refuse. The mix is then pressed into a building block form to 50 psi. The pressed uncured sample is then cured after which is placed into a vacuum chamber where 50 gm of methyl methacrylate monomer is added. The sample is permitted to soak for 4 hours at atmospheric pressure for full impregnation. The block is then wrapped and placed in an oven at 80° C. for 12 to 18 hours for polymerization to be complete. The final product is found to have a compressive strength of 3,700 psi.

EXAMPLE 2

The block is prepared as in the preceding example except that instead of polymerizing in an oven, it is exposed to a cobalt 60 source of gamma radiation. The strength of the final product is about the same as in the preceding example.

What is claimed is:

1. The method of making a load bearing composite useful as a material of construction, comprising:
   a. forming a physical mixture of about 50 percent by weight of compacted refuse having a specific gravity of at least about unity, about 20 percent by weight of sewage sludge, and about 30 percent by weight of cement, said sewage sludge containing 20 to 30 percent solids by weight;
   b. pressing said mixture at a pressure of about 50 psi into a shaped body;
   c. curing said shaped body;
   d. impregnating said body under vacuum with methyl methacrylate monomer;
   e. thereafter soaking said body with said monomer at atmospheric pressure; and
   f. then polymerizing said monomer in situ.

2. The method according to claim 1 in which the monomer is present in the amount of 10 to 30 percent by weight.

3. The method according to claim 2 in which polymerization is induced by gamma irradiation.

4. The method according to claim 2 in which polymerization is thermally induced.

* * * * *